United States Patent
Morich

(10) Patent No.: US 11,883,250 B2
(45) Date of Patent: Jan. 30, 2024

(54) DENTAL RESTORATION HOLDING DEVICES, DENTAL RESTORATION HOLDING ASSEMBLIES INCLUDING THE SAME, AND ASSOCIATED METHODS

(71) Applicant: Kevin R. Morich, D.M.D., P.C., Portland, OR (US)

(72) Inventor: Kevin R. Morich, Portland, OR (US)

(73) Assignee: Kevin R. Morich, D.M.D., P.C., Portland, OR (US)

( * ) Notice: Subject to any disclaimer, the term of this patent is extended or adjusted under 35 U.S.C. 154(b) by 291 days.

(21) Appl. No.: 16/878,418

(22) Filed: May 19, 2020

(65) Prior Publication Data

US 2020/0368001 A1    Nov. 26, 2020

Related U.S. Application Data

(60) Provisional application No. 62/852,501, filed on May 24, 2019.

(51) Int. Cl.
*A61C 17/00*     (2006.01)
*A61C 13/00*     (2006.01)
(Continued)

(52) U.S. Cl.
CPC ...... *A61C 13/0027* (2013.01); *A61C 13/1016* (2013.01); *A61C 13/24* (2013.01); *A61C 17/036* (2013.01)

(58) Field of Classification Search
CPC ... A61C 17/036; A61C 17/065; A61C 17/092; A61C 17/08; A61C 17/0208; A61C 17/06; A61C 17/125; A61C 17/12
See application file for complete search history.

(56) References Cited

U.S. PATENT DOCUMENTS 1,353,587 A * 9/1920 Heck ............... A61C 17/08
                                                                   433/92
1,994,869 A * 3/1935 Replogle ........... A47L 9/02
                                                                   15/422

(Continued)

FOREIGN PATENT DOCUMENTS

DE           541402 C * 1/1932 ............. A61C 17/06
DE    102005044841 A1 * 3/2006 ............. A61C 17/04

(Continued)

OTHER PUBLICATIONS

Machine-generated English language translation of Japan Patent Publication No. JP 2008-508011, downloaded from http://app.patseer.com on Nov. 1, 2016.

(Continued)

*Primary Examiner* — Heidi M Eide
(74) *Attorney, Agent, or Firm* — Kolitch Romano Dascenzo Gates LLC

(57) ABSTRACT

Dental restoration holding devices, dental restoration holding assemblies including the same, and associated methods. A dental restoration holding device includes a base portion and a cap portion, and is configured such that the base portion and/or the cap portion engages a flexible support sheet to define a support surface that supports a dental restoration relative to a suction tip. A dental restoration holding assembly for supporting a dental restoration includes the dental restoration holding device in combination with the flexible support sheet and the suction tip. A method of treating a dental restoration includes operatively engaging a flexible support sheet with a dental restoration holding device to define a support surface, placing a dental restoration upon the support surface, engaging a suction tip with the dental restoration holding device, and flowing a treatment fluid through the dental restoration holding device.

14 Claims, 8 Drawing Sheets

(51) Int. Cl.
*A61C 13/36* (2006.01)
*A61C 13/24* (2006.01)

(56) References Cited

U.S. PATENT DOCUMENTS

| | | | |
|---|---|---|---|
| 3,586,012 | A | 6/1971 | Paule |
| 3,940,012 | A | 2/1976 | Addington |
| 4,417,874 | A * | 11/1983 | Andersson ............. A61C 17/08 433/96 |
| 4,475,370 | A | 10/1984 | Stark et al. |
| 4,822,278 | A * | 4/1989 | Oliva ................... A61C 19/004 433/91 |
| 4,997,371 | A | 3/1991 | Fischer |
| 5,078,603 | A * | 1/1992 | Cohen .................... A61M 1/84 433/91 |
| 5,630,939 | A * | 5/1997 | Bulard .................. B01D 35/02 433/92 |
| 5,741,134 | A * | 4/1998 | Davis ..................... A61C 17/08 433/91 |
| 5,816,804 | A | 10/1998 | Fischer |
| 6,811,398 | B2 | 11/2004 | Bennett |
| 8,066,510 | B2 | 11/2011 | Ho et al. |
| 8,146,611 | B2 | 4/2012 | Biel et al. |
| 8,337,473 | B2 | 12/2012 | Zino Gutierrez |
| 8,801,067 | B2 | 8/2014 | Lässig et al. |
| 2002/0150863 | A1 * | 10/2002 | Bennett ................ A61C 17/036 433/218 |
| 2008/0257387 | A1 | 10/2008 | Biel et al. |
| 2010/0107579 | A1 * | 5/2010 | Meyer ..................... A47L 7/009 55/429 |
| 2010/0203470 | A1 * | 8/2010 | Sidhu ..................... A61C 17/08 433/92 |
| 2010/0297577 | A1 | 11/2010 | Cohen |
| 2015/0173850 | A1 | 6/2015 | Garrigues et al. |
| 2016/0374700 | A1 * | 12/2016 | Olden ................ A61B 1/00101 606/106 |
| 2019/0209265 | A1 * | 7/2019 | Arguello ................ A61C 17/06 |

FOREIGN PATENT DOCUMENTS

| | | | |
|---|---|---|---|
| DE | 102006015694 A1 * | 10/2007 | .......... A61C 17/036 |
| JP | 2008-508011 | 3/2008 | |
| WO | WO 81/02335 | 8/1981 | |

OTHER PUBLICATIONS

Calset Warmer Porcelain Veneer Tray, downloaded from https://www.dentalaegis.com/id/products/addent-inc/calset-warmer-porcelain-veneer-tray/?pc=ceramics on Nov. 8, 2016.

Cerec Etching Tool, downloaded from https://www.cerecdoctors.com/discussion-boards/view/id/39194/cerec-etching-tool on Nov. 7, 2016.

Coleman Plastic Filtering Funnel, downloaded from http://www.campingcomfortably.com/coleman-fuel-funnel.html on Nov. 7, 2016.

Etch-Ease Holding System, Dental Solutions, downloaded from https://www.pattersondental.com/Supplies/ItemDetail/072580801 on Sep. 28, 2016.

LDR 501 5110 Garbage Disposal Rubber Splash Guard, downloaded from https://www.amazon.com/LDR-501-5110-Garbage-Disposal/dp/B001FGY220/ref=pd_sim_60_24 ?_encoding=UTF8 &psc=1&refRID=W7T6R19NXK9D68SCPAH5 on Nov. 8, 2016.

McLaren, Edward A., "Porcelain Veneer Preparations: To Prep or Not to Prep," Inside Dentistry, May 2006, pp. 76-79.

* cited by examiner

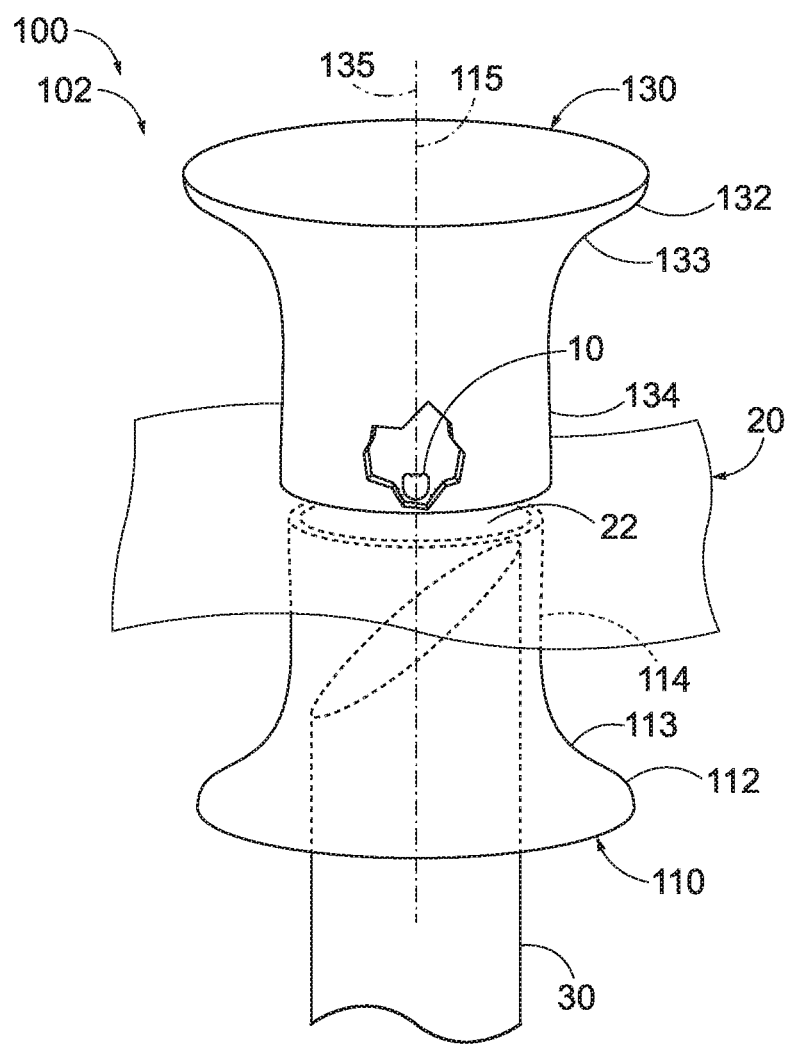
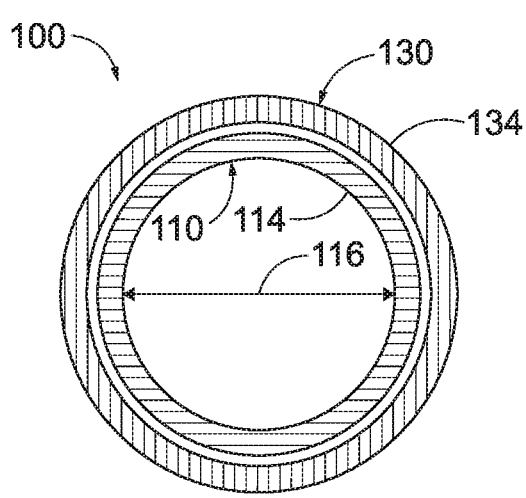 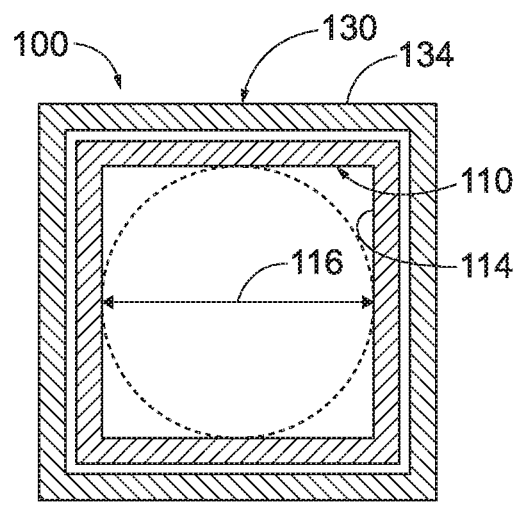

DENTAL RESTORATION HOLDING DEVICES, DENTAL RESTORATION HOLDING ASSEMBLIES INCLUDING THE SAME, AND ASSOCIATED METHODS

RELATED APPLICATION

This application claims priority to U.S. Provisional Patent Application No. 62/852,501, which is entitled "DENTAL RESTORATION HOLDING DEVICES AND ASSOCIATED METHODS," was filed on May 24, 2019, and the disclosure of which is hereby incorporated by reference.

FIELD

The present disclosure relates to dental restoration holding devices, dental restoration holding assemblies including the same, and associated methods.

BACKGROUND

In dentistry, crowns, veneers, and other dental restorations are precisely fabricated and fit to the original tooth or implant to restore proper shape, function, and aesthetics. Dental restorations are affixed to the original tooth or implant by a variety of means such as bonding. In particular, porcelain and composite crowns, veneers, and other dental restorations typically are bonded by a dental cement. Prior to bonding, a bonding surface of the dental restoration generally is prepared for bonding with an etchant such as hydrofluoric acid for porcelain surfaces. The etchant generally cleans and roughens the bonding surface at a microscopic level. Additional preparation steps, such as chemically activating the bonding surface, may be performed as well. The preparation for bonding may be performed where the dental restoration is fabricated and/or may be performed at the dentist's office during trial fit and final installation of the dental restoration.

A typical etching process includes applying a hydrofluoric acid gel to a porcelain bonding surface of a dental restoration, incubating the gel on the surface to etch the surface, rinsing the gel with water, and drying the surface. Etchants such as hydrofluoric acid may be very caustic and their use may require personal safety precautions to avoid deleterious dermal contact or inhalation. One technique to etch dental restorations in a dentist's office includes holding the dental restoration with a gauze pad during application of etchant, rinsing on the gauze pad, and suctioning away the rinse fluid. This technique generally requires careful placement of the gauze and dental restoration, and may result in accidental loss of the dental restoration into the suction device. Thus, there exists a need for dental restoration holding devices.

SUMMARY

Dental restoration holding devices, dental restoration holding assemblies including the same, and associated methods are disclosed herein. A dental restoration holding device for supporting a dental restoration includes a base portion with a hollow base shaft defining a base shaft central opening and a cap portion with a hollow cap shaft defining a cap shaft central opening. The dental restoration holding device is configured such that the base portion and/or the cap portion engages a flexible support sheet to define a support surface of the flexible support sheet that spans the base shaft central opening and/or the cap shaft central opening. The dental restoration holding device is configured such that the support surface supports a dental restoration relative to a suction tip that is positioned on an opposite side of the support surface relative to the dental restoration and that is inserted at least partially into the base portion. A dental restoration holding assembly for supporting a dental restoration includes the dental restoration holding device in combination with the flexible support sheet and the suction tip such that the flexible support sheet operatively engages the base portion and/or the cap portion and defines the support surface and such that the suction tip is operatively coupled to the base shaft to maintain the suction tip in a substantially fixed orientation relative to the support surface.

A method of treating a dental restoration includes operatively engaging a flexible support sheet with a dental restoration holding device to define a support surface of the flexible support sheet and placing a dental restoration upon the support surface. The method further includes operatively engaging a suction tip with the dental restoration holding device such that the suction tip is positioned on an opposite side of the support surface relative to the dental restoration and flowing a treatment fluid through the dental restoration holding device such that the treatment fluid flows sequentially over the dental restoration, through the support surface, and into the suction tip.

BRIEF DESCRIPTION OF THE DRAWINGS

FIG. 2 is an isometric top side view of an example of a dental restoration holding device according to the present disclosure in a disassembled configuration.

FIG. 3 is a cross-sectional top plan view, corresponding to a view taken along line A-A in FIG. 1, of an example of a dental restoration holding device according to the present disclosure with a circular base shaft and a circular cap shaft.

FIG. 4 is a cross-sectional top plan view, corresponding to a view taken along line A-A in FIG. 1, of an example of a dental restoration holding device according to the present disclosure with a square base shaft and a square cap shaft.

DETAILED DESCRIPTION

FIGS. 1-16 provide examples of dental restoration holding devices 100 and/or of methods 200 of utilizing dental restoration holding devices 100, according to the present disclosure. Elements that serve a similar, or at least substantially similar, purpose are labeled with like numbers in each of FIGS. 1-16, and these elements may not be discussed in detail herein with reference to each of FIGS. 1-16. Similarly, all elements may not be labeled in each of FIGS. 1-16, but reference numbers associated therewith may be utilized herein for consistency. Elements, components, and/or features that are discussed herein with reference to one or more of FIGS. 1-16 may be included in and/or utilized with any of FIGS. 1-16 without departing from the scope of the present disclosure.

In general, elements that are likely to be in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 1:
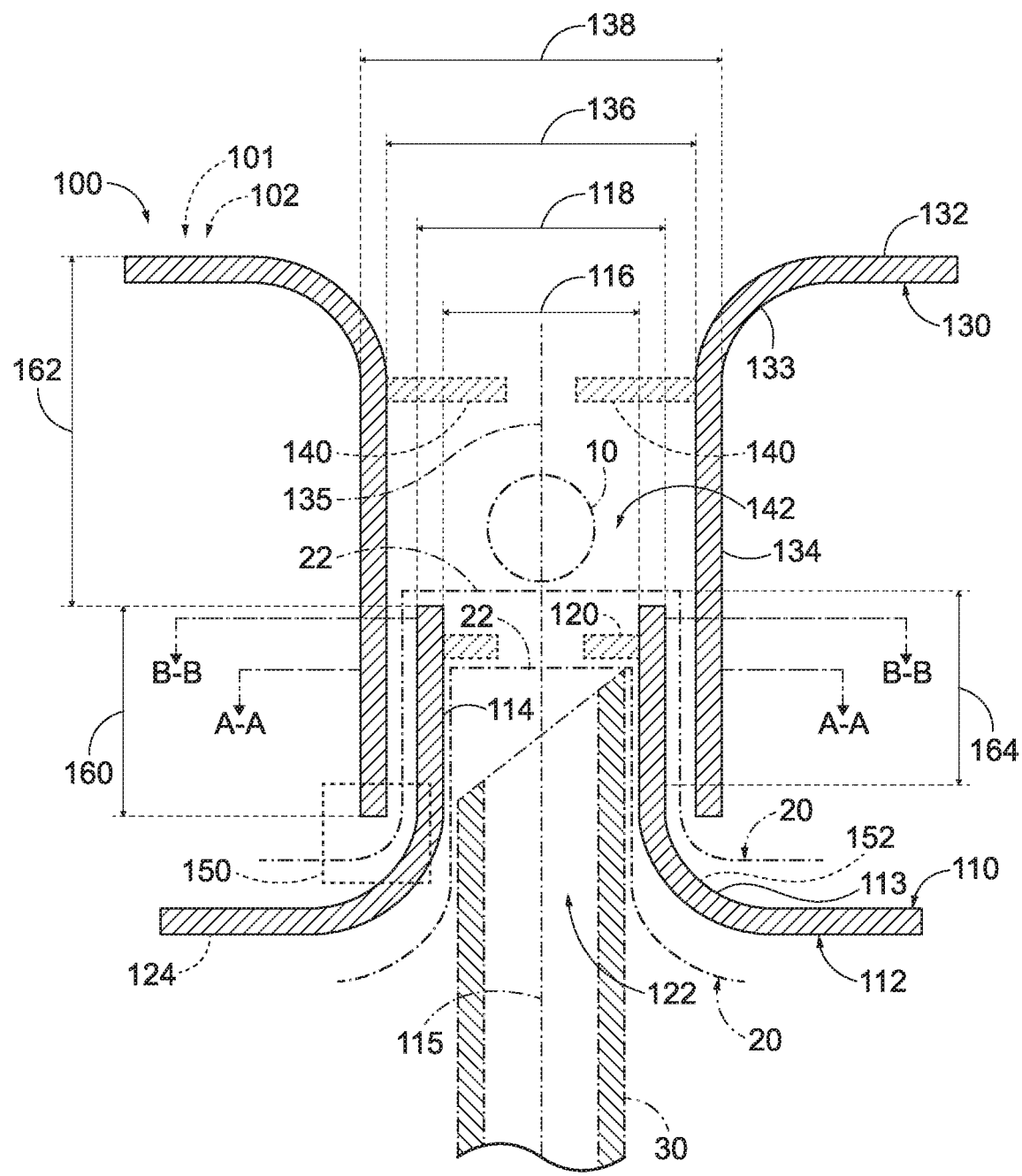
FIG. 1 is a schematic cross-sectional elevation view depicting examples of dental restoration holding devices according to the present disclosure in an assembled configuration.

As schematically illustrated in FIG. 1, a dental restoration holding device 100 according to the present disclosure includes a base portion 110 with a hollow base shaft 114 defining a base shaft central opening 122 and a cap portion 130 with a hollow cap shaft 134 defining a cap shaft central opening 142. As used herein, base shaft central opening 122 may include and/or refer to any appropriate opening, region, volume, aperture, etc. that is at least partially defined by base shaft 114, such as a region/volume enclosed by base shaft 114, an area that spans base shaft 114 along a length of base shaft 114, an aperture that permits access to base shaft 114, etc. Similarly, as used herein, cap shaft central opening 142 may include and/or refer to any appropriate opening, region, volume, aperture, etc. that is at least partially defined by cap shaft 134, such as a region/volume enclosed by cap shaft 134, an area that spans cap shaft 134 along a length of cap shaft 134, an aperture that permits access to cap shaft 134, etc.

In some examples, base portion 110 and cap portion 130 are separate (i.e., distinct) components that are configured to be selectively and operatively coupled to one another. In such examples, dental restoration holding device 100 may be referred to as a two-piece dental restoration holding device 102. In such examples, dental restoration holding device 100 is configured to selectively transition between a disassembled configuration, in which base portion 110 and cap portion 130 are separated, and an assembled configuration, in which cap shaft 134 is operatively coupled to base shaft 114 in a close-fit orientation. However, this is not required of all examples of dental restoration holding device 100, and it is additionally within the scope of the present disclosure that base portion 110 and cap portion 130 may be integrally formed, such that dental restoration holding device 100 is a one-piece dental restoration holding device 101. In such examples, one-piece dental restoration holding device 101 also may be referred to as a unitary dental restoration holding device 101. Examples of such one-piece dental restoration holding devices 101 are illustrated in FIGS. 10-15, as discussed below.

Figure 10:
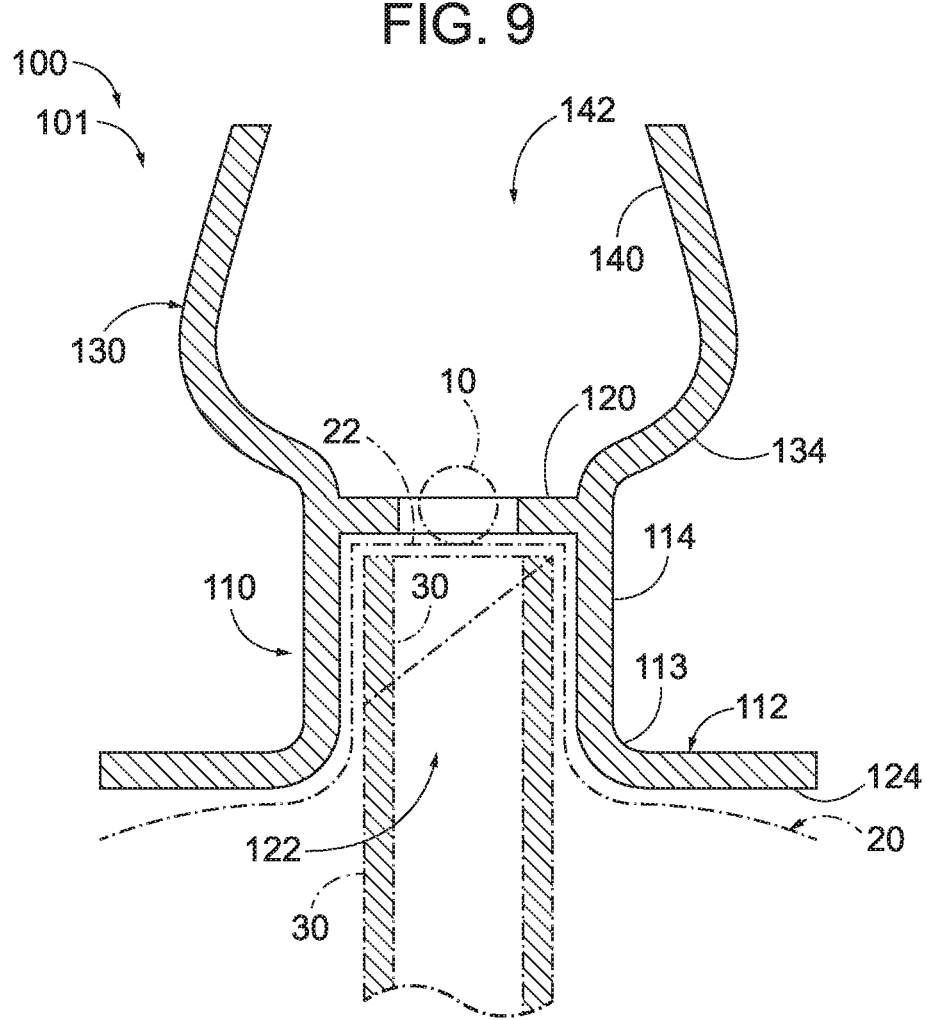
FIG. 10 is a cross-sectional elevation view of a dental restoration holding device according to the present disclosure in which the base portion and the cap portion are integrally formed.
Figure 11:
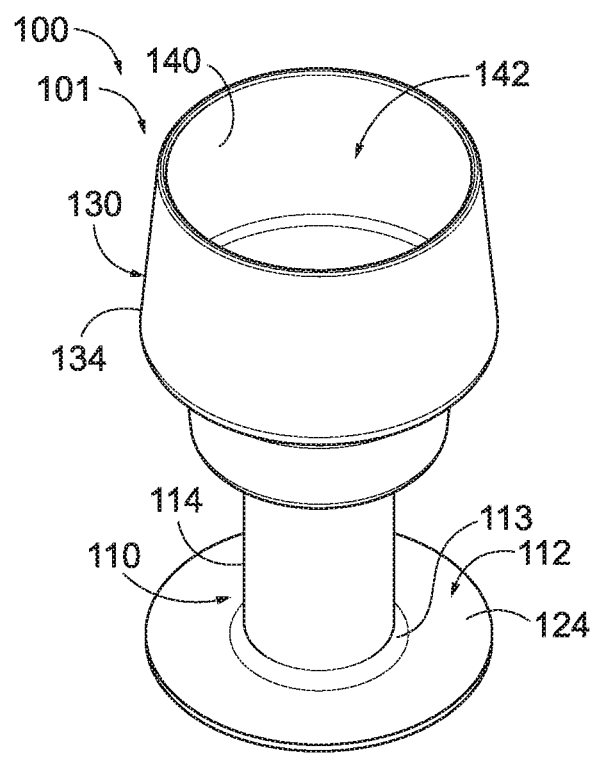
FIG. 11 is an isometric top side view of a dental restoration holding device according to the present disclosure in which the base portion and the cap portion are integrally formed.
Figure 12:
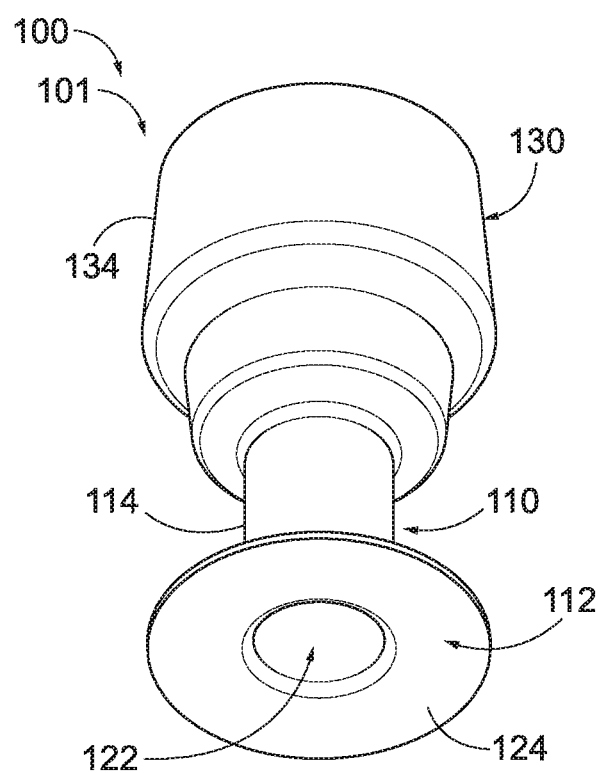
FIG. 12 is an isometric bottom side view of the dental restoration holding device of FIG. 11.
Figure 13:
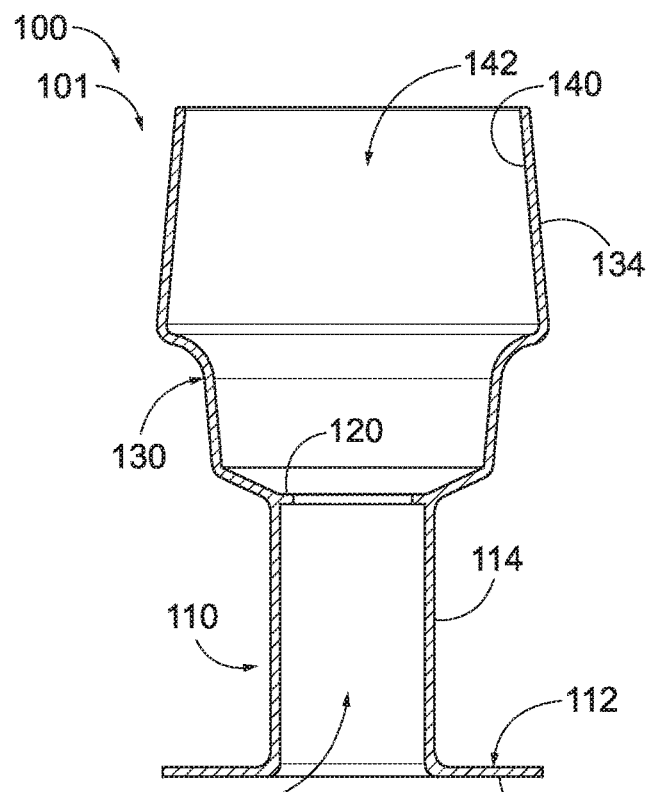
FIG. 13 is a cross-sectional elevation view of the dental restoration holding device of FIGS. 11-12.
Figure 14:
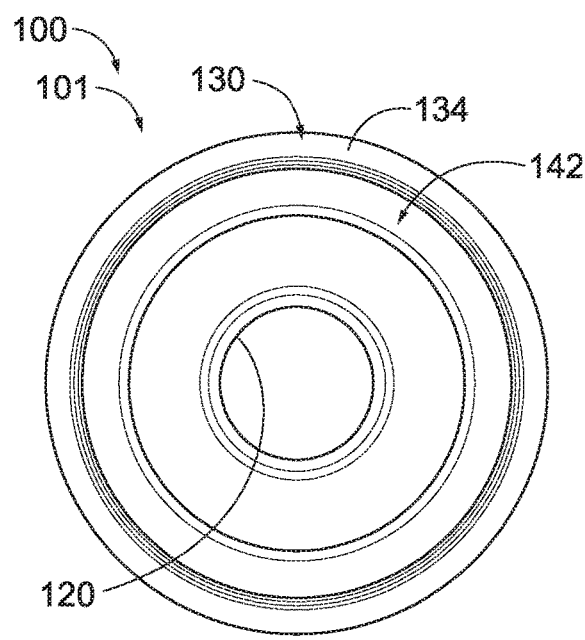
FIG. 14 is a top plan view of the dental restoration holding device of FIGS. 11-13.
Figure 15:
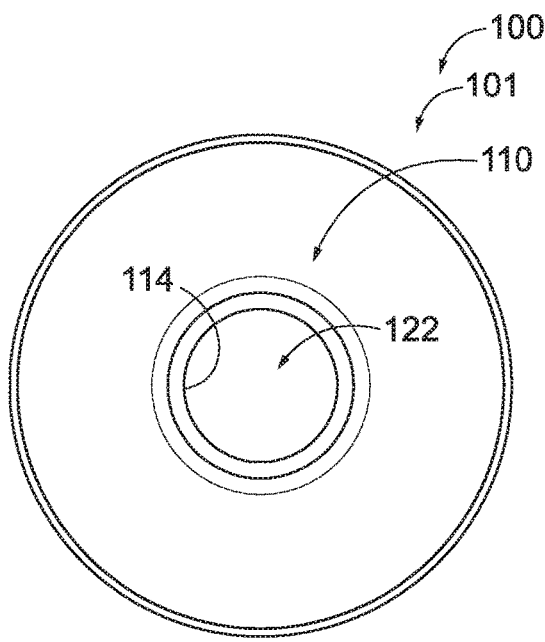
FIG. 15 is a bottom plan view of the dental restoration holding device of FIGS. 11-14.

In examples in which base portion 110 and cap portion 130 are separate components, and as schematically illustrated in FIG. 1, base portion 110 and cap portion 130 may be configured to engage a portion of flexible support sheet 20 between base shaft 114 and cap shaft 134 when dental restoration holding device 100 is in the assembled configuration. In such a configuration, flexible support sheet 20 defines a support surface 22 that spans (e.g., covers) base shaft central opening 122 and/or cap shaft central opening 142. As examples, flexible support sheet 20 and/or support surface 22 may be described as "spanning" base shaft central opening 122 and/or cap shaft central opening 142 when flexible support sheet 20 covers all, or at least substantially all, of a cross-sectional area of the base shaft central opening and/or cap shaft central opening, such as at a location at an end of base shaft 114 and/or of cap shaft 134, and/or at a location between the ends of the base shaft and/or the cap shaft. In examples in which base portion 110 and cap portion 130 are integrally formed, and as illustrated in FIG. 10, base portion 110 may be configured to engage flexible support sheet 20 to define support surface 22 that spans at least base shaft central opening 122.

Support surface 22 may be taut and/or under tension during operative use of dental restoration holding device 100. As an example, when two-piece dental restoration holding device 102 is in operative use in the assembled configuration, flexible support sheet 20 may be engaged between base shaft 114 and cap shaft 134 such that support surface 22 is taut and/or under tension. As another example, when unitary dental restoration holding device 101 is in operative use, base portion 110 may engage flexible support sheet 20 in such a manner that support surface 22 is taut and/or under tension.

Support surface 22 is configured to support a dental restoration 10 relative to a suction tip 30 positioned on an opposite side of the support surface relative to the dental restoration. More specifically, and as described herein, dental restoration holding device 100 generally is configured to be utilized in conjunction with suction tip 30 such that the suction tip is at least partially inserted into base portion 110 (such as within base shaft 114 and/or base shaft central opening 122), and dental restoration holding device 100 generally is configured to support dental restoration 10 relative to suction tip 30 such that the dental restoration is restricted from falling into the suction tip. In this manner, configuring support surface 22 to be taut and/or under tension during operative use of dental restoration holding device 100 may facilitate precise placement of, and/or ready access to, dental restoration 10 upon support surface 22.

Dental restoration 10 may include and/or be any appropriate dental restoration, appliance, and/or prosthesis, examples of which include a dental crown, a dental veneer, an inlay, an onlay, and/or a dental bridge. Dental restoration holding device 100 may be utilized during and/or in conjunction with a procedure in which dental restoration 10 is etched with an etchant such as a hydrofluoric acid gel. During such an etching procedure, it may be desirable to rinse and/or dry dental restoration 10 (such as with clean water and/or air) to remove the etchant from the surface of the dental restoration. In some such examples, rinsing and/or drying is facilitated and/or accelerated by placing suction tip 30 underneath and/or otherwise adjacent to the dental restoration. In such examples, positioning flexible support sheet 20 between dental restoration 10 and suction tip 30 may operate to restrict the dental restoration from falling into the suction tip. In such a configuration, dental restoration holding device 100 may facilitate maintaining the dental restoration, the flexible support sheet, and/or the suction tip in a desired orientation with respect to one another.

Base portion 110, cap portion 130, and/or flexible support sheet 20 may be formed from any appropriate materials, such as materials that may be compatible with etchants, hydrofluoric etchants, and/or other reactants utilized during use of dental restoration holding device 100. Stated differently, each of base portion 110, cap portion 130, and/or flexible support sheet 20 may be formed of a material that resists etching and/or degrading when exposed to an etchant, such as when dental restoration 10 is etched within dental restoration holding device 100. Additionally or alternatively, each of base portion 110, cap portion 130, and/or flexible support sheet 20 may be formed of a material that is sterilizable (e.g., configured to be sterilized via a conventional sterilization process), such as a material that is compatible with an autoclave, a steam sterilizing process, and/or a cold sterilizing process. As examples, each of base portion 110 and/or cap portion 130 may include and/or be formed of a plastic, polytetrafluoroethylene (PTFE), high-density polyethylene (HDPE), a metal, aluminum, titanium, platinum, and/or gold.

While the figures generally illustrate base portion 110 and cap portion 130 as being shell-like components with a substantially uniform thickness, this is not required to all examples of dental restoration holding device 100, and it is additionally within the scope of the present disclosure that base portion 110 and/or cap portion 130 may have regions of differing thicknesses. In such examples, such regions of different thickness within base portion 110 and/or cap portion 130 may be configured to enhance properties such as durability, structural integrity, ease of manufacturing, etc. The inner and outer profiles of base portion 110 and/or of cap portion 130 may have similar geometries (as shown in the figures), or one or more regions of base portion 110 and/or of cap portion 130 may have distinct inner and outer profiles.

Flexible support sheet 20 may be formed of any appropriate materials for supporting dental restoration 10 relative to suction tip 30 while permitting fluid flow therethrough. Stated differently, flexible support sheet 20 may be any appropriate material configured to support dental restoration 10 in such a manner that the dental restoration may be rinsed with a liquid (such as water) that is collected by suction tip 30 without deteriorating and/or losing its strength, so as to restrict the dental restoration from falling into the suction tip. As examples, flexible support sheet 20 may include and/or be a mesh, a screen, a porous sheet, a fabric, a woven fabric, a matted fabric, a natural fabric, a synthetic fabric, a cotton sheet, a nylon sheet, a polypropylene sheet, a gauze sheet, a perforated sheet, a membrane, a porous membrane, and/or a perforated membrane. Flexible support sheet 20 may be a single sheet, or may include and/or be a plurality of layered plies and/or sheets. Flexible support sheet 20 may be replaceable and/or disposable, such as to facilitate sterility and/or reduce a risk of chemical contamination between uses of dental restoration holding device 100.

When dental restoration holding device 100 is a two-piece dental restoration holding device 102 that is in the assembled configuration, and as schematically illustrated in FIG. 1, flexible support sheet 20 may be retained in place via a frictional interaction, such as a frictional interaction between flexible support sheet 20 and each of base shaft 114 and cap shaft 134. Alternatively, when dental restoration holding device 100 is a one-piece dental restoration holding device 101, and as schematically illustrated in FIG. 10, flexible support sheet 20 may be retained in place via a frictional interaction with each of base shaft 114 and suction tip 30. Additionally or alternatively, in all examples, flexible support sheet 20 may be bonded to base shaft 114 and/or to cap shaft 134 at least when dental restoration holding device 100 is in the assembled configuration. For example, flexible support sheet 20 may be operatively and/or temporarily bonded to any appropriate portion of base shaft 114 and/or cap shaft 134, such as at or near a perimeter of base shaft central opening 122, cap shaft central opening 142, and/or support surface 22. Flexible support sheet 20 may be operatively and/or temporarily bonded to base shaft 114 and/or cap shaft 134 in any appropriate manner, such as via an adhesive. While the figures of the present application schematically illustrate base portion 110, cap portion 130, dental restoration 10, flexible support sheet 20, and/or suction tip 30 as being spaced apart from one another for clarity, it is to be understood that such elements may be in direct contact, such as frictional engagement, with one other in any appropriate combination during operative use of dental restoration holding device 100, as described herein.

FIG. 1 schematically illustrates examples of two-piece dental restoration holding devices 102 in the assembled configuration, while FIG. 2 is a perspective view of a two-piece dental restoration holding device in the disassembled configuration. As illustrated in FIG. 2, base shaft 114 may define and/or extend along a base shaft central axis 115, and cap shaft 134 may define and/or extend along a cap shaft central axis 135, such that the base shaft central axis and the cap shaft central axis are collinear, or at least substantially collinear, at least when dental restoration holding device 100 is in the assembled configuration. Stated differently, FIG. 2 may be described as illustrating a two-piece dental restoration holding device 102 immediately prior to transitioning from the disassembled configuration to the assembled configuration. As illustrated in FIG. 2, two-piece dental restoration holding device 102 may be configured to transition to the assembled configuration only when base shaft central axis 115 and cap shaft central axis 135 are at least substantially collinear.

As illustrated in FIGS. 1-2, 6-8, 10-13, and 15, base portion 110 may include a base flange 112 that is integrally formed with hollow base shaft 114 and that extends perpendicular, or at least substantially perpendicular, to base shaft central axis 115. Base portion 110 additionally may include a base portion transition region 113 such that base shaft 114 and base flange 112 are connected via the base portion transition region. Base portion transition region 113 may have any appropriate profile, such as a profile that is abrupt, tapered, conical, smoothly curved, and/or includes circumferential regions of differing profiles. As used herein, the term "abrupt," as used to describe a transition region, may describe a transition that has a small average radius of curvature, e.g., that is less than the thickness of base flange 112. An abrupt transition at the outer profile may include a step or shoulder formed between base shaft 114 and base flange 112, and may be useful for positive and repeatable engagement between cap shaft 134 and base portion 110. A smoothly curved transition, by contrast, may be characterized by a large average radius of curvature, e.g., an average radius of curvature that is several times larger than the thickness of base flange 112. In some examples, and as illustrated in FIGS. 1-2 and 6-8, base portion transition region 113 is smoothly curved at both the inner profile (which may engage suction tip 30) and the outer profile (which may engage cap shaft 134 and/or the user's fingers). A smooth, tapered, and/or conical transition at the inner profile may facilitate insertion of suction tip 30 into base shaft 114, such as by providing a surface to lead and/or guide the suction tip into the base shaft. A smooth, tapered, and/or conical transition at the outer profile may facilitate engagement between cap shaft 134 and base portion 110 (e.g., to facilitate a wedge-like engagement). With reference to FIGS. 1, 6, 7, 10, and 13, base flange 112 may be described as having an outer-most dimension transverse to base shaft central axis 115 and a flange height in the direction of base shaft central axis 115, and hollow base shaft 114 may be described as having a shaft height in the direction of base shaft central axis 115. In some examples, the outer-most dimension of base flange 112 is greater than the flange height of base flange 112, and the shaft height of hollow base shaft 114 is greater than the flange height of base flange 112.

Similarly, and as illustrated in FIGS. 1-2 and 6-7, cap portion 130 may include a cap flange 132 that extends perpendicular, or at least substantially perpendicular, to cap shaft central axis 135 (labeled in FIGS. 1-2). Cap portion 130 additionally may include a cap portion transition region 133 such that cap shaft 134 and cap flange 132 are connected via the cap portion transition region. Cap portion transition region 133 may have a profile that is abrupt, tapered, conical, smoothly curved, and/or that includes circumferential regions of differing profiles. In some examples, cap portion transition region 133 is an abrupt transition that has a small average radius of curvature, e.g., less than the thickness of cap flange 132. An abrupt transition at the outer profile may include a step or shoulder formed between cap shaft 134 and cap flange 132, and may be useful for positive and repeatable engagement between base shaft 114 and cap portion 130 (e.g., in the arrangement illustrated in FIG. 6). A smoothly curved transition may have a large average radius of curvature, e.g., an average radius of curvature that is several times larger than the thickness of cap flange 132. In some examples, and as illustrated in FIGS. 1-2 and 6-7, cap portion transition region 133 is smoothly curved at both the inner profile (open to insert dental restoration 10) and the outer profile (which may engage base shaft 114 and/or the user's fingers). A smooth, tapered, and/or conical transition at the inner profile may facilitate insertion of dental restoration 10 and/or a tool for manipulating and/or rinsing the dental restoration into cap shaft 134. A smooth, tapered, and/or conical transition at the outer profile may facilitate engagement between base shaft 114 and cap portion 130 (e.g., to facilitate a wedge-like engagement).

As schematically illustrated in FIG. 1, and as less schematically illustrated in FIGS. 6-7, 10-13, and 15, base portion 110 additionally may include a stand portion 124 configured to permit dental restoration holding device 100 to rest upon a horizontal surface in an upright orientation. As a more specific example, when dental restoration holding device 100 is a two-piece dental restoration holding device 102, stand portion 124 may be configured to permit the dental restoration holding device to rest upon the horizontal surface in the upright orientation when the dental restoration holding device is in the assembled configuration. Such a configuration may enable a user to set dental restoration holding device 100 down upon a horizontal surface such as a tabletop while dental restoration 10 is supported by support surface 22 without the dental restoration falling out of the dental restoration holding device. Additionally or alternatively, such a configuration may permit a user to hold and/or retain dental restoration holding device 100 upon the horizontal surface by pressing down upon stand portion 124, such as with the user's fingers. Stand portion 124 may include and/or be any appropriate structure. In some examples, base flange 112 is sufficiently wide relative to a height of dental restoration holding device 100 in the assembled configuration to stably maintain the dental restoration holding device in an upright orientation. In such examples, the base flange may be described as including and/or being stand portion 124.

Figure 5:
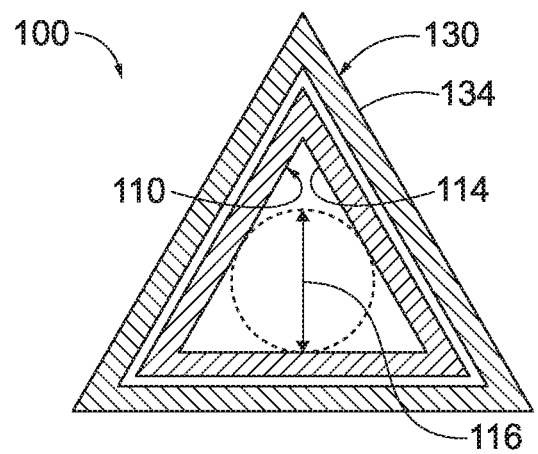
FIG. 5 is a cross-sectional top plan view, corresponding to a view taken along line A-A in FIG. 1, of an example of a dental restoration holding device according to the present disclosure with a triangular base shaft and a triangular cap shaft.

Base shaft 114 may have any appropriate shape and/or size for engaging suction tip 30, and cap shaft 134 may have any appropriate shape and/or size for operatively engaging the base shaft (when dental restoration holding device 100 is a two-piece dental restoration holding device 102). As examples, base shaft 114 may have a base shaft cross-sectional shape, and cap shaft 134 may have a cap shaft cross-sectional shape, such that the base shaft cross-sectional shape and the cap shaft cross-sectional shape are similar. As examples, the base shaft cross-sectional shape and the cap shaft cross-sectional shape both may be circular, elliptical, rectangular, square, triangular, and/or quadrilateral. FIG. 3 schematically illustrates an embodiment in which the base shaft cross-sectional shape and the cap shaft cross-sectional shape both are circular, while FIG. 4 illustrates an embodiment in which the base shaft cross-sectional shape and the cap shaft cross-sectional shape both are square, and FIG. 5 illustrates an embodiment in which the base shaft cross-sectional shape and the cap shaft cross-sectional shape both are triangular. As illustrated in FIGS. 3-5, the base shaft cross-sectional shape and the cap shaft cross-sectional shape may be complementary shapes, and/or may be geometrically similar shapes. However, this is not required, and it is within the scope of the present disclosure that the base shaft cross-sectional shape and the cap shaft cross-sectional shape may be geometrically dissimilar shapes, so long as base shaft 114 and cap shaft 134 are capable of adequately retaining flexible support sheet 20 therebetween. As an example, the base shaft cross-sectional shape may be octagonal, and the cap shaft cross-sectional shape may be a square that circumscribes the base shaft cross-sectional shape.

It is additionally within the scope of the present disclosure that base shaft 114 and/or cap shaft 134 may have a cross-sectional shape that varies across, along, and/or through an extent (e.g., a length) of the shaft. For example, in an embodiment in which base shaft 114 is configured to be received within cap shaft 134, the base shaft may have an inner surface with a circular cross-sectional shape, such as to facilitate secure engagement with suction tip 30, and the base shaft may have an outer surface with a non-circular and/or keyed cross-sectional shape, such as may correspond to a cross-sectional shape of an inner surface of the cap shaft. Additionally or alternatively, base shaft 114 and/or cap shaft 134 may have a cross-sectional shape that transitions from one shape to another shape along a length of the shaft. As an example, base shaft 114 may have a lower cross-sectional shape that is circular in a region configured to engage suction tip 30, and may have an upper cross-sectional shape that is non-circular in a region configured to engage cap shaft 134.

As illustrated in FIG. 1, base shaft 114 may be characterized by a base shaft inner diameter 116, such as may be configured to receive suction tip 30 by frictionally engaging an outer surface of the suction tip. For example, base shaft inner diameter 116 may be substantially equal to and/or slightly larger than an outer diameter of suction tip 30. As illustrated in FIGS. 4-5, when the base shaft cross-sectional shape is not circular, base shaft inner diameter 116 may correspond to a diameter of a largest circle that may be inscribed within the base shaft cross-sectional shape. Stated differently, base shaft inner diameter 116 may correspond to a largest diameter of suction tip 30 that may be inserted within base shaft 114. Base shaft 114 generally may be configured for close-fit coupling with suction tip 30, such as to ensure that a majority, and optionally substantially all, of a suction flow that enters the suction tip traverses support surface 22 when a vacuum source is applied to the suction tip and when dental restoration holding device 100 operatively engages flexible support sheet 20 to form support surface 22.

As further illustrated in FIG. 1, base shaft 114 also may by characterized by a base shaft outer diameter 118, and cap shaft 134 may be characterized by a cap shaft inner diameter 136 and a cap shaft outer diameter 138. Each of base shaft inner diameter 116, base shaft outer diameter 118, cap shaft inner diameter 136, and cap shaft outer diameter 138 may be any appropriate size, such as may correspond to (e.g., be approximately equal to) a diameter of suction tip 30. As examples, each of base shaft inner diameter 116, base shaft outer diameter 118, cap shaft inner diameter 136, and cap shaft outer diameter 138 may be at least 10 millimeters (mm), at least 15 mm, at least 20 mm, at least 25 mm, at least 30 mm, at least 35 mm, at least 40 mm, at least 45 mm, at most 50 mm, at most 47 mm, at most 42 mm, at most 37 mm, at most 32 mm, at most 27 mm, at most 22 mm, at most 17 mm, and/or at most 12 mm.

In examples in which dental restoration holding device 100 is a two-piece dental restoration holding device 102, base portion 110 and cap portion 130 may be configured to operatively engage one another in any appropriate manner. As used herein, base portion 110 and cap portion 130 (and/or any appropriate components thereof) may be described as engaging one another and/or as being operatively coupled to one another when dental restoration holding device 100 is in the assembled configuration even if the base portion and the cap portion are not in direct physical contact. That is, when dental restoration holding device 100 is in the assembled configuration, base portion 110 and cap portion 130 may be at least partially, and optionally fully, separated by flexible support sheet 20 positioned between the base portion and the cap portion, but still may be described as operatively engaging one another and/or being operatively coupled to one another in a close-fit orientation. Alternatively, dental restoration holding device 100 may be described as being in the assembled configuration even in the absence of flexible support sheet 20, such as when base portion 110 and cap portion 130 (and/or any appropriate components thereof) are operatively coupled to one another and in direct contact with one another.

In some embodiments, base shaft 114 and cap shaft 134 each may be tapered for positive engagement with one another. In such an embodiment, base shaft 114 and cap shaft 134 each may have any appropriate draft angle, such as at most 15 degrees, at most 10 degrees, at most 5 degrees, and/or at most 2 degrees. In an embodiment in which base shaft 114 and/or cap shaft 134 is tapered, base shaft inner diameter 116, base shaft outer diameter 118, cap shaft inner diameter 136, and/or cap shaft outer diameter 138 may refer to any appropriate respective diameters, such as a maximum diameter, a minimum diameter, and/or an average diameter.

As illustrated in FIG. 1, base shaft 114 and cap shaft 134 may be configured to overlap by an overlap depth 160, as measured in a direction parallel to base shaft central axis 115. Overlap depth 160 may be sufficiently large to restrict base shaft 114 and cap shaft 134 from tilting with respect to one another and/or otherwise becoming inadvertently disengaged. Additionally or alternatively, in an embodiment of dental restoration holding device 100 that includes base flange 112 and cap flange 132, overlap depth 160 may be sufficiently large for a user to insert the user's fingers between the base flange and the cap flange to pinch base shaft 114 and/or cap shaft 134, and/or may be sufficiently small for the user's fingers to simultaneously engage both the base flange and the cap flange. Additionally or alternatively, overlap depth 160 may be sufficiently large to secure flexible support sheet 20 between base shaft 114 and cap shaft 134 in a static, or at least substantially static, orientation. As more specific examples, overlap depth 160 may be at least 3 mm, at least 5 mm, at least 10 mm, at least 15 mm, at least 20 mm, at least 25 mm, at least 30 mm, at most 35 mm, at most 32 mm, at most 27 mm, at most 22 mm, at most 17 mm, at most 12 mm, at most 7 mm, and/or at most 4 mm.

As further illustrated in FIG. 1, cap portion 130 may be characterized by a recess depth 162, as measured from support surface 22 to an end of the cap portion distal the support surface and in a direction parallel to cap shaft central axis 135 when dental restoration holding device 100 is in the assembled configuration. As used herein, recess depth 162 also may be referred to as a well depth 162 and/or a working depth 162. Recess depth 162 may be larger than a height and/or thickness of dental restoration 10, and/or may be sufficiently large to restrict liquid from splashing out of dental restoration holding device 100 when dental restoration 10 is being rinsed while being supported by support surface 22. Additionally or alternatively, recess depth 162 may be small enough to permit the user to visually locate and/or manually manipulate dental restoration 10 (such as with the user's fingers and/or with a tool such as forceps) when the dental restoration is supported by support surface 22, and/or to apply an etchant and/or a rinsing fluid to the dental restoration. As more specific examples, recess depth 162 may be at least 10 mm, at least 20 mm, at least 30 mm, at least 40 mm, at most 50 mm, at most 45 mm, at most 35 mm, at most 25 mm, and/or at most 15 mm.

As further illustrated in FIG. 1, base shaft 114 also may be characterized by a base shaft relief depth 164, as measured from support surface 22 to an end of the base shaft distal the support surface and in a direction parallel to base shaft central axis 115. Base shaft relief depth 164 may be sufficiently large to retain suction tip 30 in a friction fit without base shaft 114 and the suction tip tilting with respect to one another and/or otherwise becoming inadvertently disengaged. As examples, base shaft relief depth 164 may be a multiple of base shaft inner diameter 116, such as at least equal to the base shaft inner diameter, at least 1.25 times the base shaft inner diameter, at least 1.5 times the base shaft inner diameter, at least 1.75 times the base shaft inner diameter, at least 2 times the base shaft inner diameter, at least 2.5 times the base shaft inner diameter, and/or at least 3 times the base shaft inner diameter.

Figure 7:
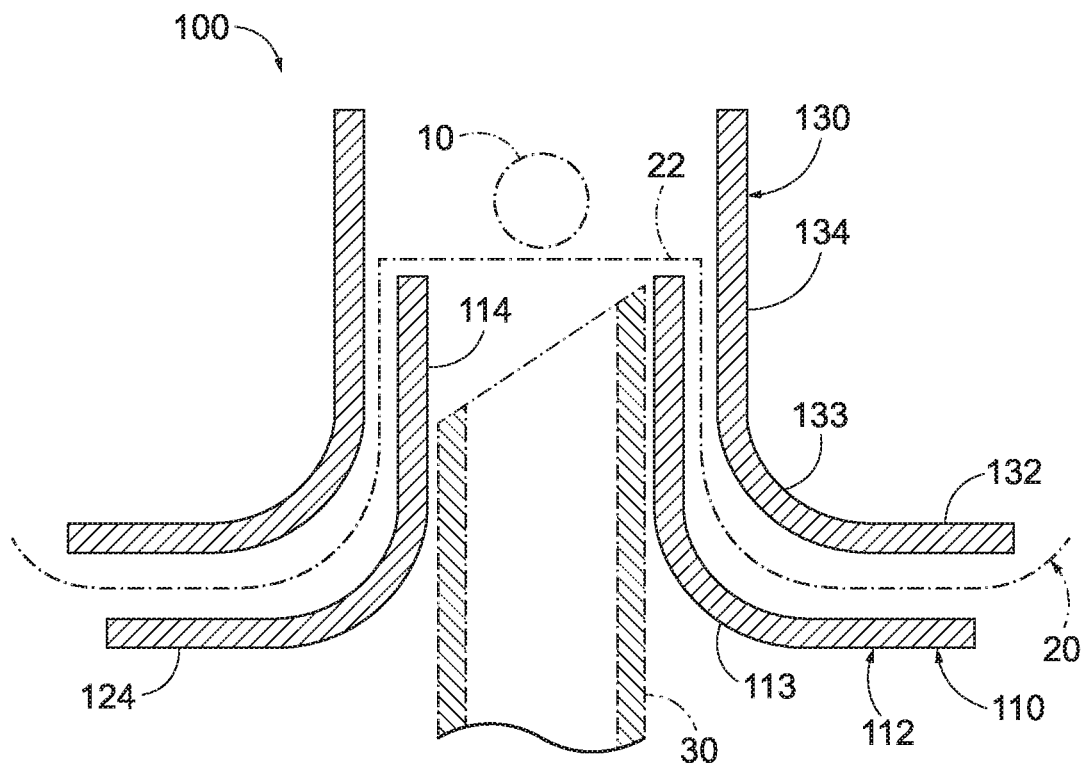
FIG. 7 is a cross-sectional elevation view of the dental restoration holding device of FIG. 6 in a nested configuration.
Figure 8:
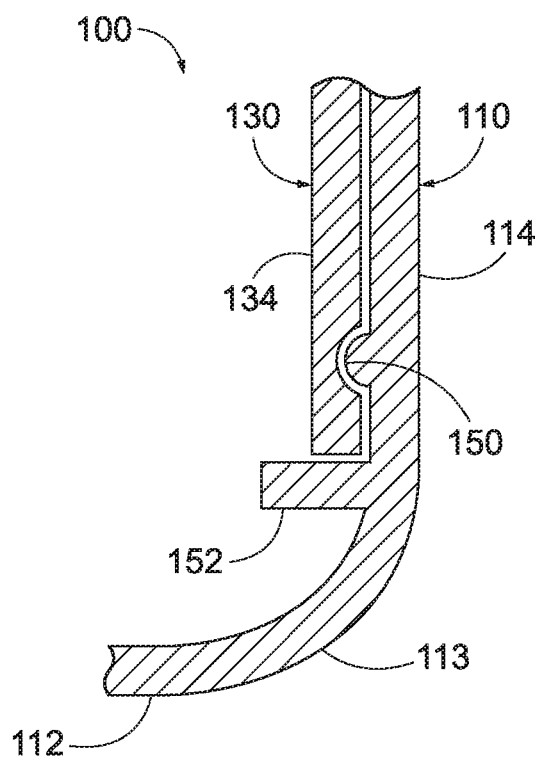
FIG. 8 is a fragmentary cross-sectional elevation view of a portion of an example of a dental restoration holding device according to the present disclosure that includes a locking mechanism and a shaft stop.

In some embodiments of dental restoration holding device 100, and as illustrated in FIGS. 1-5 and 7-8, base shaft 114 may be configured to be received within cap shaft 134. In such an embodiment, base portion 110 and/or cap portion 130 may be configured to limit an extent to which the base portion may be inserted into the cap portion. For example, and as illustrated in FIG. 1, cap shaft 134 may be configured to abut base portion transition region 113 when dental restoration holding device 100 is in the assembled configuration, thereby defining overlap depth 160. Additionally or alternatively, and as schematically illustrated in FIG. 1, base portion 110 may include a shaft stop 152 extending away from base shaft central axis 115 and configured to engage cap shaft 134 to define overlap depth 160. As an example, and as illustrated in FIG. 8, shaft stop 152 may include and/or be a protrusion extending from base shaft 114 and/or base portion transition region 113 to engage cap shaft 134.

In an embodiment of dental restoration holding device 100 in which base shaft 114 is configured to be received within cap shaft 134, cap shaft inner diameter 136 may be larger than base shaft outer diameter 118. As more specific examples, a difference between base shaft outer diameter 118 and cap shaft inner diameter 136 may be at least 0.1 mm, at least 0.3 mm, at least 0.5 mm, at least 1 mm, at least 3 mm, at most 5 mm, at most 2 mm, at most 1 mm, at most 0.7 mm, at most 0.4 mm, and/or at most 0.2 mm. The difference between base shaft outer diameter 118 and cap shaft inner diameter 136 may correspond to and/or be at least substantially equal to a thickness of flexible support sheet 20, such as a thickness of the flexible support sheet when compressed between base portion 110 and cap portion 130. However, this is not required, and it is additionally within the scope of the present disclosure that the difference between base shaft outer diameter 118 and cap shaft inner diameter 136 may be greater than a thickness of flexible support sheet 20. For example, in an embodiment of dental restoration holding device 100 in which cap shaft 134 abuts base portion transition region 113 and/or shaft stop 152, flexible support sheet 20 may be loosely engaged with base shaft 114 and/or cap shaft 134, and flexible support sheet 20 may be retained in position primarily, or even entirely, by an interface between the cap shaft and the base portion transition region and/or between the cap shaft and the shaft stop.

FIG. 1 illustrates an embodiment of dental restoration holding device 100 in which base shaft 114 is configured to be received within cap shaft 134 such that support surface 22 is positioned between base flange 112 and cap flange 132 when the dental restoration holding device is in the assembled configuration. Such a configuration may be referred to as an extended configuration of dental restoration holding device 100. However, this is not required, and it is additionally within the scope of the present disclosure that support surface 22 may not be positioned between base flange 112 and cap flange 132 when dental restoration holding device 100 is in the assembled configuration. For example, and as illustrated in FIG. 7, base shaft 114 may be configured to be received within cap shaft 134 such that cap flange 132 is positioned between base flange 112 and support surface 22. Such a configuration may be referred to as a compact configuration of dental restoration holding device 100. It is further within the scope of the present disclosure that a given dental restoration holding device 100 may be configured to be utilized in either of the extended configuration and the compact configuration.

Figure 6:
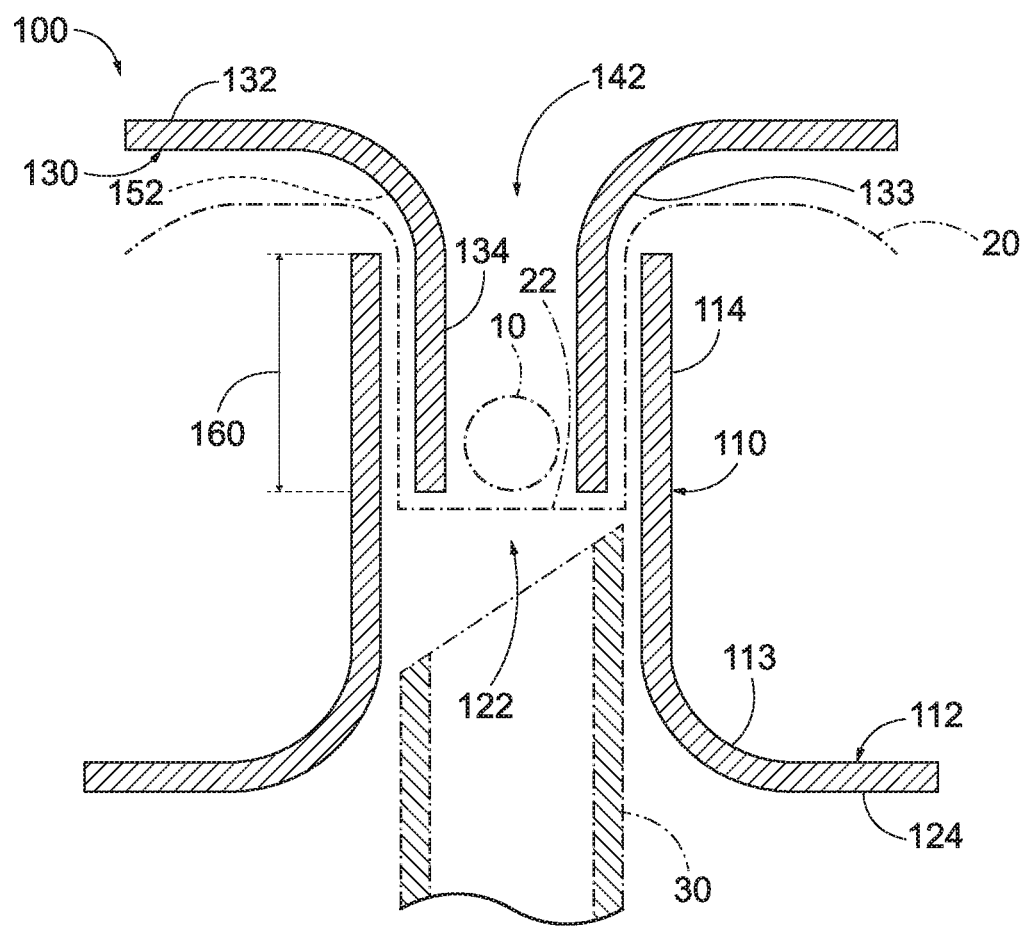
FIG. 6 is a cross-sectional plan view of an example of a dental restoration holding device according to the present disclosure in which the cap shaft is received within the base shaft.

In some embodiments of dental restoration holding device 100, and as illustrated in FIG. 6, cap shaft 134 may be configured to be received within base shaft 114. In such an embodiment, base portion 110 and/or cap portion 130 may be configured to limit an extent to which the cap portion may be inserted into the base portion. For example, and as illustrated in FIG. 6, base shaft 114 may be configured to abut cap portion transition region 133 when dental restoration holding device 100 is in the assembled configuration, thereby defining overlap depth 160. Additionally or alternatively, cap portion 130 may include shaft stop 152 to engage base shaft 114 to define overlap depth 160. In such an embodiment, shaft stop 152 may include and/or be a protrusion extending from cap shaft 134 and/or cap portion transition region 133 to engage base shaft 114. In an embodiment of dental restoration holding device 100 in which cap shaft 134 is configured to be received within base shaft 114, cap shaft outer diameter 138 may be smaller than base shaft inner diameter 116. As more specific examples, a difference between cap shaft outer diameter 138 and base shaft inner diameter 116 may be at least 0.1 mm, at least 0.3 mm, at least 0.5 mm, at least 1 mm, at least 3 mm, at most 5 mm, at most 2 mm, at most 1 mm, at most 0.7 mm, at most 0.4 mm, and/or at most 0.2 mm. However, this is not required, and it is additionally within the scope of the present disclosure that the difference between cap shaft outer diameter 138 and base shaft inner diameter 116 may be greater than a thickness of flexible support sheet 20. For example, in an embodiment of dental restoration holding device 100 in which base shaft 114 abuts cap portion transition region 133 and/or shaft stop 152, flexible support sheet 20 may be loosely engaged with base shaft 114 and/or cap shaft 134, and flexible support sheet 20 may be retained in position primarily, or even entirely, by an interface between the base shaft and the cap portion transition region and/or between the base shaft and the shaft stop.

As discussed, when dental restoration holding device 100 is a two-piece dental restoration holding device 102, base portion 110 and cap portion 130 may be configured to engage one another in a friction fit, such as a fit in which flexible support sheet 20 is positioned between and frictionally engages each of base shaft 114 and cap shaft 134. Additionally or alternatively, and as schematically illustrated in FIG. 1, dental restoration holding device 100 further may include a locking mechanism 150 configured to selectively retain base portion 110 and cap portion 130 in engagement with one another and/or in a selected orientation with respect to one another. Stated differently, locking mechanism 150 may be configured to selectively retain dental restoration holding device 100 in the assembled configuration. As examples, locking mechanism 150 may include and/or be a magnetic locking mechanism, a mechanical locking mechanism, a snap lock mechanism, a rotary locking mechanism, and/or a bayonet mount. FIG. 8 illustrates an example of dental restoration holding device 100 with locking mechanism 150 in the form of a snap lock mechanism.

Figure 9:
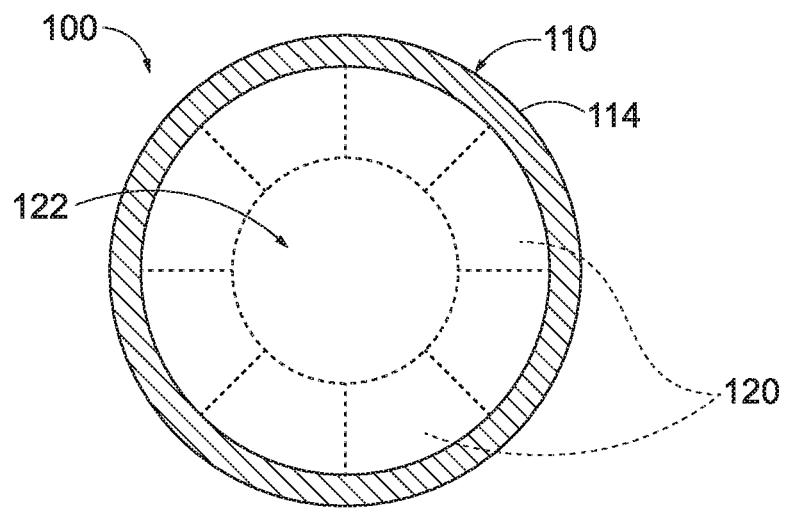
FIG. 9 is a cross-sectional top plan view, corresponding to a view taken along line B-B in FIG. 1, of an example of a dental restoration holding device according to the present disclosure that includes an inner shaft catch.

Returning to FIG. 1, base shaft 114 may include an inner shaft catch 120 extending into base shaft central opening 122 and configured to restrict suction tip 30 from extending fully through the base shaft central opening and into cap shaft central opening 142. Stated differently, inner shaft catch 120 may be configured to engage suction tip 30 so as to restrict the suction tip from contacting and/or penetrating flexible support sheet 20 and/or support surface 22 while permitting fluid to flow through the support surface and into the suction tip. As illustrated in FIGS. 1 and 9, inner shaft catch 120 may form an inner rim of base shaft 114. Additionally or alternatively, and as schematically illustrated in FIG. 9, inner shaft catch 120 may extend along an entirety of a perimeter of base shaft central opening 122, or may include one or more disconnected segments distributed along the perimeter of the base shaft central opening. In some embodiments, inner shaft catch 120 may be angled toward suction tip 30 to engage a bias opening of the suction tip.

As further schematically illustrated in FIG. 1, cap portion 130 further may include a splash guard 140 at least partially obstructing cap shaft central opening 142 and configured to restrict a liquid from splashing out of dental restoration holding device 100 when dental restoration 10 is being rinsed while being supported by support surface 22. Splash guard 140 may extend at least partially into cap shaft central opening 142, such as from cap flange 132, cap portion transition region 133, and/or cap shaft 134. Additionally or alternatively, splash guard 140 may be angled toward support surface 22 when dental restoration holding device 100 is in the assembled configuration. Such a configuration may facilitate permitting rinse water to reach dental restoration 10 while inhibiting the rinse water from splashing out of cap portion 130. While FIG. 1 schematically illustrates splash guard 140 as extending away from cap shaft 134 into cap shaft central opening 142, this is not required of all examples of dental restoration holding device 100, and it is additionally within the scope of the present disclosure that cap shaft 134 may include and/or define splash guard 140. For example, and as illustrated in FIG. 10, cap shaft 134 may taper inward toward a top of the cap shaft to restrict a liquid from splashing out of dental restoration holding device 100. In such an example, an upper portion of cap shaft 134 may be referred to as splash guard 140.

FIGS. 10-15 illustrate examples of one-piece dental restoration holding devices 101 in which base portion 110 is integrally formed with cap portion 130. Specifically, FIG. 10 schematically illustrates a one-piece dental restoration holding device 101 that encloses a dental restoration 10 and that operatively engages support sheet 20 and suction tip 30, while FIGS. 11-15 are less schematic illustrations of an example of a one-piece dental restoration holding device 101. In such examples, and as illustrated in FIG. 10, a portion of flexible support sheet 20 may be positioned between base shaft 114 of base portion 110 and suction tip 30 to form support surface 22. FIGS. 10-15 additionally illustrate examples in which base shaft 114 includes inner shaft catch 120 (shown in FIGS. 10 and 13-14) in the form of an annular projection that forms an inner rim of base shaft 114. In this manner, inner shaft catch 120 serves to limit an extent to which suction tip 30 may be inserted into dental restoration holding device 100, and additionally defines a location of support surface 22. As illustrated in FIG. 10, suction tip 30 may have a suction end that is angled (e.g., a chisel tip, as illustrated in dash-dot lines), or may have a suction end that is substantially flat (illustrated in dash-dot-dot lines). In examples in which dental restoration holding device 100 is a one-piece dental restoration holding device 101, it may be desirable to utilize the dental restoration holding device in conjunction with a suction tip 30 that includes a substantially flat suction end to facilitate maintaining a flat and/or taut support surface 22 between suction tip 30 and inner shaft catch 120.

Figure 16:
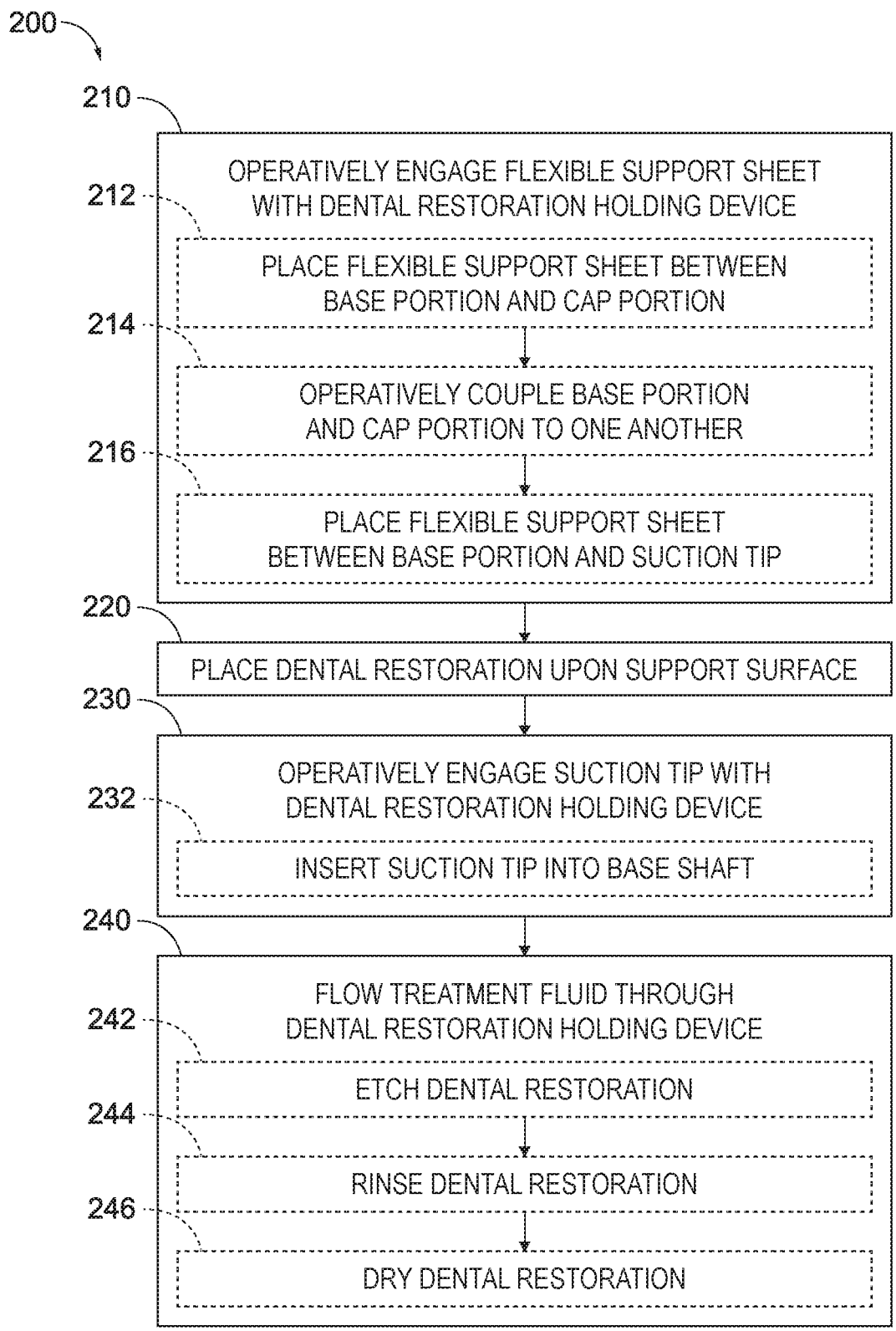
FIG. 16 is a flowchart schematically representing examples of methods of treating a dental restoration according to the present disclosure.

FIG. 16 is a flowchart depicting methods 200, according to the present disclosure, of utilizing a dental restoration holding device (such as dental restoration holding device 100) to treat a dental restoration (such as dental restoration 10). As shown in FIG. 16, methods 200 include operatively engaging, at 210, a flexible support sheet (such as flexible support sheet 20) with the dental restoration holding device to define a support surface (such as support surface 22) of the flexible support sheet. Methods 200 additionally include placing, at 220, a dental restoration (such as dental restoration 10) upon the support surface and operatively engaging, at 230, a suction tip (such as suction tip 30) with the dental restoration holding device such that the suction tip is positioned on an opposite side of the support surface relative to the dental restoration. Methods 200 further include flowing, at 240, a treatment fluid through the dental restoration holding device such that the treatment fluid flows sequentially over the dental restoration, through the support surface, and into the suction tip.

The operatively engaging the flexible support sheet at 210 may be performed in any appropriate manner. For example, the dental restoration holding device may include a base portion (such as base portion 110) and a cap portion (such as cap portion 130) configured to be selectively and operatively coupled to one another. In such examples, and as shown in FIG. 16, the operatively engaging at 210 may include placing, at 212, the flexible support sheet between the base portion and the cap portion. In such examples, the operatively engaging at 210 additionally may include operatively coupling, at 214, the base portion and the cap portion to one another to transition the dental restoration holding device to an assembled configuration. As a more specific example, the base portion may include a base shaft (such as base shaft 114), the cap portion may include a cap shaft (such as cap shaft 134), and the operatively coupling the base portion and the cap portion at 214 may include inserting one of the base shaft and the cap shaft into the other of the base shaft and the cap shaft.

In other examples, the base portion and the cap portion may be integrally formed with one another. In such examples, and as shown in FIG. 16, the operatively engaging the flexible support sheet at 210 may include placing, at 216, the flexible support sheet between the base portion and the suction tip prior to operatively engaging the suction tip at 230.

In all examples of method 200, the operatively engaging the suction tip with the dental restoration holding device at 230 may include selectively receiving the suction tip within the dental restoration holding device. For example, and as shown in FIG. 16, the operatively engaging at 230 may include inserting, at 232, the suction tip into the base shaft of the base portion of the dental restoration holding device.

The flowing the treatment fluid through the dental restoration holding device at 240 may include flowing any appropriate fluid over the dental restoration, such as to treat the dental restoration. As more specific examples, and as shown in FIG. 16, the flowing at 240 may include etching, at 242, the dental restoration with an etchant; rinsing, at 244, the dental restoration with water; and/or drying, at 246, the dental restoration with air. Each of the etching at 242, the rinsing at 244, and the drying at 246 may be considered to represent an example of flowing a treatment fluid over the dental restoration. Accordingly, treatment fluid utilized in the flowing at 240 may include and/or be any appropriate fluid, examples of which include a gas, air, a liquid, water, clean water, a gel, an etchant, an acid, hydrofluoric acid, and/or hydrofluoric acid gel.

Illustrative, non-exclusive examples of dental restoration holding devices, dental restoration holding assemblies including the same, and associated methods according to the present disclosure are described in the following enumerated paragraphs. It is within the scope of the present disclosure that an individual step of a method recited herein, including in the following enumerated paragraphs, additionally or alternatively may be referred to as a "step for" performing the recited action.

A1. A dental restoration holding device for supporting a dental restoration, comprising:
  a base portion with a hollow base shaft defining a base shaft central opening; and
  a cap portion with a hollow cap shaft defining a cap shaft central opening;
  wherein one or both of the base portion or the cap portion is configured to engage a flexible support sheet to define a support surface of the flexible support sheet that spans one or both of the base shaft central opening or the cap shaft central opening for supporting a dental restoration relative to a suction tip that is positioned on an opposite side of the support surface relative to the dental restoration and that is inserted at least partially into the base portion.

A1.1. The dental restoration holding device of paragraph A1, wherein the base portion and the cap portion are integrally formed with one another.

A1.2. The dental restoration holding device of paragraph A1, wherein the dental restoration holding device is configured to selectively transition between a disassembled configuration and an assembled configuration; wherein the cap shaft is configured to be operatively coupled to the base shaft in a close-fit orientation when the dental restoration holding device is in the assembled configuration; wherein the base portion and the cap portion are configured to engage the flexible support sheet between the base shaft and the cap shaft when the dental restoration holding device is in the assembled configuration to define the support surface.

A2. The dental restoration holding device of paragraph A1.2, wherein the base shaft defines a base shaft central axis, wherein the cap shaft defines a cap shaft central axis, and wherein the base shaft central axis and the cap shaft central axis are collinear, or at least substantially collinear, when the dental restoration holding device is in the assembled configuration.

A3. The dental restoration holding device of any of paragraphs A1-A2, wherein each of the base portion and the cap portion is formed of a material that resists etching by an etchant.

A4. The dental restoration holding device of any of paragraphs A1-A3, wherein each of the base portion and the cap portion includes at least one of a plastic, polytetrafluoroethylene (PTFE), high-density polyethylene (HDPE), a metal, aluminum, titanium, platinum, and gold.

A5. The dental restoration holding device of any of paragraphs A1-A4, wherein each of the base portion and the cap portion is formed of a material that is at least one of sterilizable, compatible with an autoclave, compatible with a steam sterilizing process, and/or compatible with a cold sterilizing process.

A6. The dental restoration holding device of any of paragraphs A1-A5, wherein the dental restoration includes at least one of a dental crown, a dental veneer, an inlay, an onlay, and a dental bridge.

A7. The dental restoration holding device of any of paragraphs A1-A6, wherein the flexible support sheet includes at least one of a mesh, a screen, a porous sheet, a fabric, a woven fabric, a matted fabric, a natural fabric, a synthetic fabric, a cotton sheet, a nylon sheet, a polypropylene sheet, a gauze sheet, a perforated sheet, a membrane, a porous membrane, and a perforated membrane.

A8. The dental restoration holding device of any of paragraphs A1-A7, wherein the flexible support sheet includes a plurality of layered plies.

A9. The dental restoration holding device of any of paragraphs A1-A8, wherein the flexible support sheet is formed of a material that resists etching by an etchant.

A10. The dental restoration holding device of any of paragraphs A1-A9, wherein the flexible support sheet is formed of a material that is at least one of sterilizable, compatible with an autoclave, compatible with a steam sterilizing process, and/or compatible with a cold sterilizing process.

A11. The dental restoration holding device of any of paragraphs A1-A10, wherein the flexible support sheet is configured to be bonded to at least one of the base shaft and the cap shaft.

A12. The dental restoration holding device of any of paragraphs A1-A11, wherein the flexible support sheet is configured to support the dental restoration while permitting fluids to flow therethrough.

A13. The dental restoration holding device of any of paragraphs A1-A12, wherein the base shaft has a base shaft cross-sectional shape, wherein the cap shaft has a cap shaft cross-sectional shape, and wherein each of the base shaft cross-sectional shape and the cap shaft cross-sectional shape is at least one of circular, elliptical, rectangular, square, triangular, and quadrilateral.

A14. The dental restoration holding device of paragraph A13, wherein the base shaft cross-sectional shape and the cap shaft cross-sectional shape are complementary.

A15. The dental restoration holding device of any of paragraphs A13-A14, wherein the base shaft cross-sectional shape and the cap shaft cross-sectional shape are geometrically similar shapes.

A16. The dental restoration holding device of any of paragraphs A13-A15, wherein the base shaft cross-sectional shape and the cap shaft cross-sectional shape are geometrically dissimilar shapes.

A17. The dental restoration holding device of any of paragraphs A1-A16, wherein the base shaft has an inner cross-sectional shape that is circular and an outer cross-sectional shape that is non-circular.

A18. The dental restoration holding device of any of paragraphs A1.2-A17, wherein the base shaft has a lower cross-sectional shape that is circular in a region configured to engage the suction tip and an upper cross-sectional shape that is non-circular in a region configured to engage the cap shaft.

A19. The dental restoration holding device of any of paragraphs A1.2-A18, wherein each of the base shaft and the cap shaft are tapered for positive engagement with one another. A20. The dental restoration holding device of paragraph A19, wherein each of the base shaft and the cap shaft has a draft angle that is at least one of at most 15 degrees, at most 10 degrees, at most 5 degrees, and at most 2 degrees.

A21. The dental restoration holding device of any of paragraphs A1-A20, wherein the base portion further includes a base flange that extends perpendicular, or at least substantially perpendicular, to a/the base shaft central axis.

A22. The dental restoration holding device of paragraph A21, wherein the base portion further includes a base portion transition region, and wherein the base shaft and the base flange are connected via the base portion transition region.

A23. The dental restoration holding device of paragraph A22, wherein the base portion transition region is smoothly curved.

A24. The dental restoration holding device of any of paragraphs A1-A23, wherein the cap portion further includes a cap flange that extends perpendicular, or at least substantially perpendicular, to a/the cap shaft central axis.

A25. The dental restoration holding device of paragraph A24, wherein the cap portion further includes a cap portion transition region, and wherein the cap shaft and the cap flange are connected via the cap portion transition region.

A26. The dental restoration holding device of paragraph A25, wherein the cap portion transition region is smoothly curved.

A27. The dental restoration holding device of any of paragraphs A1.2-A26, wherein the base shaft and the cap shaft are configured to overlap by an overlap depth, as measured in a direction parallel to a/the base shaft central axis when the dental restoration holding device is in the assembled configuration, and wherein the overlap depth is at least one of at least 3 millimeters (mm), at least 5 mm, at least 10 mm, at least 15 mm, at least 20 mm, at least 25 mm, at least 30 mm, at most 35 mm, at most 32 mm, at most 27 mm, at most 22 mm, at most 17 mm, at most 12 mm, at most 7 mm, and at most 4 mm.

A28. The dental restoration holding device of any of paragraphs A1-A27, wherein the base shaft has a base shaft inner diameter such that the base shaft is configured to receive the suction tip therein by frictionally engaging an outer surface of the suction tip.

A29. The dental restoration holding device of paragraph A28, wherein the base shaft inner diameter is at least one of at least 10 mm, at least 15 mm, at least 20 mm, at least 25 mm, at least 30 mm, at least 35 mm, at least 40 mm, at least 45 mm, at most 50 mm, at most 47 mm, at most 42 mm, at most 37 mm, at most 32 mm, at most 27 mm, at most 22 mm, at most 17 mm, and at most 12 mm.

A30. The dental restoration holding device of any of paragraphs A28-A29, wherein the base shaft has a base shaft relief depth, as measured from the support surface to an end of the base shaft distal the support surface and in a direction parallel to a/the base shaft central axis, wherein the base shaft relief depth is a multiple of the base shaft inner diameter, and wherein the multiple is at least one of at least 1, at least 1.25, at least 1.5, at least 1.75, at least 2, at least 2.5, and at least 3.

A31. The dental restoration holding device of any of paragraphs A1-A30, wherein the base shaft is configured to engage the suction tip such that at least substantially all of a suction flow that enters the suction tip traverses the support surface when a vacuum source is applied to the suction tip when the dental restoration holding device operatively engages the flexible support sheet to form the support surface.

A32. The dental restoration holding device of any of paragraphs A1.2-A31, wherein the cap portion has a recess depth, as measured from the support surface to an end of the cap portion distal the support surface and in a direction parallel to a/the cap shaft central axis when the dental restoration holding device is in the assembled configuration, and wherein the recess depth is at least one of at least 10 mm, at least 20 mm, at least 30 mm, at least 40 mm, at most 50 mm, at most 45 mm, at most 35 mm, at most 25 mm, and at most 15 mm.

A33. The dental restoration holding device of any of paragraphs A1.2-A32, wherein at least one of the base portion and the cap portion includes a shaft stop extending away from a/the base shaft central axis and configured to engage at least one of the cap shaft and the base shaft to define a/the overlap depth.

A34. The dental restoration holding device of paragraph A33, when dependent from paragraph A22, wherein the base portion transition region includes the shaft stop.

A35. The dental restoration holding device of any of paragraphs A1.2-A34, wherein the base shaft is configured to be received within the cap shaft.

A36. The dental restoration holding device of any of paragraphs A1.2-A35, wherein the base shaft has a base shaft outer diameter and wherein the cap shaft has a cap shaft inner diameter that is larger than the base shaft outer diameter.

A37. The dental restoration holding device of paragraph A36, wherein each of the base shaft outer diameter and the cap shaft inner diameter is at least one of at least 10 mm, at least 15 mm, at least 20 mm, at least 25 mm, at least 30 mm, at least 35 mm, at least 40 mm, at least 45 mm, at most 50 mm, at most 47 mm, at most 42 mm, at most 37 mm, at most 32 mm, at most 27 mm, at most 22 mm, at most 17 mm, and at most 12 mm.

A38. The dental restoration holding device of any of paragraphs A36-A37, wherein a difference between the base shaft outer diameter and the cap shaft inner diameter is at least one of at least 0.1 mm, at least 0.3 mm, at least 0.5 mm, at least 1 mm, at least 3 mm, at most 5 mm, at most 2 mm, at most 1 mm, at most 0.7 mm, at most 0.4 mm, and at most 0.2 mm.

A39. The dental restoration holding device of any of paragraphs A35-A38, when dependent from paragraph A22, wherein the cap shaft is configured to abut the base portion transition region when the dental restoration holding device is in the assembled configuration.

A40. The dental restoration holding device of any of paragraphs A35-A39, when dependent from paragraphs A21 and A24, wherein the base shaft is configured to be received in the cap shaft in a nesting configuration in which the cap flange is positioned between the support surface and the base flange when the dental restoration holding device is in the assembled configuration.

A41. The dental restoration holding device of any of paragraphs A1.2-A34, wherein the cap shaft is configured to be received within the base shaft.

A42. The dental restoration holding device of paragraph A41, wherein the base shaft has a/the base shaft inner diameter and wherein the cap shaft has a cap shaft outer diameter that is smaller than the base shaft inner diameter.

A43. The dental restoration holding device of paragraph A42, wherein the cap shaft outer diameter is at least one of at least 10 mm, at least 15 mm, at least 20 mm, at least 25 mm, at least 30 mm, at least 35 mm, at least 40 mm, at least 45 mm, at most 50 mm, at most 47 mm, at most 42 mm, at most 37 mm, at most 32 mm, at most 27 mm, at most 22 mm, at most 17 mm, and at most 12 mm.

A44. The dental restoration holding device of any of paragraphs A42-A43, wherein a difference between the base shaft inner diameter and the cap shaft outer diameter is at least one of at least 0.1 mm, at least 0.3 mm, at least 0.5 mm, at least 1 mm, at least 3 mm, at most 5 mm, at most 2 mm, at most 1 mm, at most 0.7 mm, at most 0.4 mm, and at most 0.2 mm.

A45. The dental restoration holding device of any of paragraphs A41-A44, when dependent from paragraph A25, wherein the base shaft is configured to abut the cap portion transition region when the dental restoration holding device is in the assembled configuration.

A46. The dental restoration holding device of any of paragraphs A41-A45, when dependent from paragraphs A25 and A33, wherein the cap portion transition region includes the shaft stop configured to engage the base shaft to define the overlap depth.

A47. The dental restoration holding device of any of paragraphs A1-A46, wherein the base shaft includes an inner shaft catch extending into the base shaft central opening and configured to restrict the suction tip from extending fully through the base shaft central opening and into the cap shaft central opening.

A48. The dental restoration holding device of paragraph A47, wherein the inner shaft catch extends along an entirety of a perimeter of the base shaft central opening.

A49. The dental restoration holding device of any of paragraphs A47-A48, wherein the inner shaft catch forms an inner rim of the base shaft.

A50. The dental restoration holding device of any of paragraphs A47-A49, wherein the inner shaft catch is angled to engage a bias opening of the suction tip.

A51. The dental restoration holding device of any of paragraphs A47-A50, wherein the inner shaft catch includes one or more disconnected segments distributed along a/the perimeter of the base shaft central opening.

A52. The dental restoration holding device of any of paragraphs A1.2-A51, wherein the dental restoration holding device further includes a locking mechanism configured to selectively retain the base portion and the cap portion in engagement with one another.

A53. The dental restoration holding device of paragraph A52, wherein the locking mechanism includes at least one of a magnetic locking mechanism, a mechanical locking mechanism, a snap lock mechanism, a rotary locking mechanism, and a bayonet mount.

A54. The dental restoration holding device of any of paragraphs A1-A53, wherein the cap portion further includes a splash guard at least partially obstructing the cap shaft central opening and configured to restrict a liquid sprayed into the cap shaft from splashing out of the cap shaft.

A55. The dental restoration holding device of paragraph A54, wherein the splash guard extends at least partially into the cap shaft central opening.

A56. The dental restoration holding device of any of paragraphs A54-A55, when dependent from paragraph A1.2, wherein the splash guard is angled toward the support surface when the dental restoration holding device is in the assembled configuration.

A57. The dental restoration holding device of any of paragraphs A54-A56, wherein the splash guard extends away from the cap shaft into the cap shaft central opening.

A58. The dental restoration holding device of any of paragraphs A54-A57, wherein the cap shaft includes the splash guard.

A59. The dental restoration holding device of paragraph A58, wherein an upper portion of the cap shaft tapers inwardly toward a/the cap shaft central axis to form the splash guard.

A60. The dental restoration holding device of any of paragraphs A1.2-A59, wherein the base portion includes a stand portion configured to permit the dental restoration holding device to rest upon a horizontal surface in an upright orientation, optionally when the dental restoration holding device is in the assembled configuration.

A61. The dental restoration holding device of paragraph A60, when dependent from paragraph A21, wherein the stand portion is defined by the base flange.

B1. A dental restoration holding assembly for supporting a dental restoration, comprising:
  the dental restoration holding device of any of paragraphs A1-A61;
  the flexible support sheet operatively engaging one or both of the base portion or the cap portion and defining the support surface that spans one or both of the base shaft central opening or the cap shaft central opening; and
  the suction tip positioned on an opposite side of the support surface relative to the dental restoration;
  wherein the suction tip is operatively coupled to the base shaft to maintain the suction tip in a substantially fixed orientation relative to the support surface.

B2. The dental restoration holding assembly of paragraph B1, wherein a portion of the flexible support sheet is positioned between the base shaft and the cap shaft.

B3. The dental restoration holding assembly of paragraph B2, wherein the base portion is operatively coupled to the cap portion via the flexible support sheet.

B4. The dental restoration holding assembly of paragraph B1, wherein a portion of the flexible support sheet is positioned between the base shaft and the suction tip.

C1. A method of treating a dental restoration, the method comprising:
  operatively engaging a flexible support sheet with a dental restoration holding device to define a support surface of the flexible support sheet;
  placing a dental restoration upon the support surface;
  operatively engaging a suction tip with the dental restoration holding device such that the suction tip is positioned on an opposite side of the support surface relative to the dental restoration; and
  flowing a treatment fluid through the dental restoration holding device such that the treatment fluid flows sequentially over the dental restoration, through the support surface, and into the suction tip.

C2. The method of paragraph C1, wherein the dental restoration holding device includes a base portion and a cap portion configured to be selectively and operatively coupled to one another, and wherein the operatively engaging the flexible support sheet with the dental restoration holding device includes:
  (i) placing the flexible support sheet between the base portion and the cap portion; and
  (ii) operatively coupling the base portion and the cap portion to one another to transition the dental restoration holding device to an assembled configuration.

C3. The method of paragraph C2, wherein the operatively coupling the base portion and the cap portion to one another includes inserting one of a base shaft of the base portion and a cap shaft of the cap portion into the other of the base shaft and the cap shaft.

C4. The method of paragraph C1, wherein the dental restoration holding device includes a base portion and a cap portion that are integrally formed with one another, wherein the operatively engaging the flexible support sheet with the dental restoration holding device includes placing the flexible support sheet between the base portion and the suction tip.

C5. The method of any of paragraphs C1-C4, wherein the operatively engaging the suction tip with the dental restoration holding device includes inserting the suction tip into a/the base shaft of a/the base portion of the dental restoration holding device.

C6. The method of any of paragraphs C1-C5, wherein the flowing the treatment fluid through the dental restoration holding device includes one or more of:
(i) etching the dental restoration with an etchant;
(ii) rinsing the dental restoration with water; and
(iii) drying the dental restoration with air.

C7. The method of any of paragraphs C1-C6, wherein the treatment fluid includes one or more of a gas, air, a liquid, water, clean water, a gel, an etchant, an acid, hydrofluoric acid, or hydrofluoric acid gel.

C8. The method of any of paragraphs C1-C7, wherein the dental restoration holding device is the dental restoration holding device of any of paragraphs A1-A61.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, when the disclosure, the preceding numbered paragraphs, or subsequently filed claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A dental restoration holding device for supporting a dental restoration, comprising:
   a base portion with a hollow base shaft defining a base shaft central opening; and
   a cap portion with a hollow cap shaft defining a cap shaft central opening, wherein the cap portion is integrally formed with the base portion, and wherein the hollow base shaft of the base portion extends from the cap portion, and wherein a maximum inner diameter of the cap portion is greater than a minimum outer diameter of the base portion;
   wherein the base portion comprises a base flange that is integral with the hollow base shaft of the base portion and that extends radially outward from the hollow base shaft, opposite the cap portion, and perpendicular to a base shaft central axis that is defined by the base shaft, wherein the base flange defines a stand portion configured to permit the dental restoration holding device to rest upon a horizontal surface in an upright orientation, wherein the base flange has a flange width and a flange height, wherein the flange width is greater than the flange height, and wherein the hollow base shaft has a shaft height that is greater than the flange height;
   wherein the base shaft includes an inner shaft catch extending into the base shaft central opening and configured to restrict a suction tip from extending fully through the base shaft central opening and into the cap shaft central opening; and
   wherein an upper portion of the cap shaft tapers inwardly toward a cap shaft central axis that is defined by the cap shaft to form a splash guard.

2. The dental restoration holding device of claim 1, wherein the base shaft has a base shaft inner diameter such that the base shaft is configured to receive a suction tip therein by frictionally engaging an outer surface of the suction tip; and wherein the base shaft inner diameter is 10-50 mm.

3. The dental restoration holding device of claim 1, wherein the inner shaft catch extends along an entirety of a perimeter of the base shaft central opening and forms an inner rim of the base shaft.

4. The dental restoration holding device of claim 1, wherein the splash guard at least partially obstructs the cap shaft central opening and is configured to restrict a liquid sprayed into the cap shaft from splashing out of the cap shaft.

5. The dental restoration holding device of claim 4, wherein the splash guard extends at least partially into the cap shaft central opening.

6. A dental restoration holding assembly for supporting a dental restoration, comprising:
   the dental restoration holding device of claim 1;
   a suction tip positioned within the hollow base shaft; and
   a flexible support sheet positioned between the suction tip and the dental restoration holding device to define a support surface of the flexible support sheet that spans the base shaft central opening.

7. The dental restoration holding assembly of claim 6, wherein a portion of the flexible support sheet is positioned between the base shaft and the suction tip.

8. The dental restoration holding assembly of claim 6, wherein the flexible support sheet includes at least one of a mesh, a screen, a porous sheet, a fabric, a woven fabric, a matted fabric, a natural fabric, a synthetic fabric, a cotton sheet, a nylon sheet, a polypropylene sheet, a gauze sheet, a perforated sheet, a membrane, a porous membrane, and a perforated membrane.

9. A method of using the dental restoration holding device of claim 1, the method comprising:
   operatively engaging a flexible support sheet with the dental restoration holding device to define a support surface of the flexible support sheet;
   placing a dental restoration upon the support surface;
   operatively engaging a suction tip with the dental restoration holding device such that the suction tip is positioned on an opposite side of the support surface relative to the dental restoration; and
   flowing a treatment fluid through the dental restoration holding device such that the treatment fluid flows sequentially over the dental restoration, through the support surface, and into the suction tip.

10. The method of claim 9, wherein the operatively engaging the flexible support sheet with the dental restoration holding device includes placing the flexible support sheet between the base portion and the suction tip.

11. The method of claim 10, wherein the operatively engaging the suction tip with the dental restoration holding device includes inserting the suction tip into the hollow base shaft of the base portion of the dental restoration holding device.

12. The method of claim 10, wherein the flowing the treatment fluid through the dental restoration holding device includes one or more of:
   (i) etching the dental restoration with an etchant;
   (ii) rinsing the dental restoration with water; and
   (iii) drying the dental restoration with air.

13. The dental restoration holding device of claim 1, wherein the base portion further includes a base portion transition region, wherein the base shaft and the base flange are connected via the base portion transition region, and wherein the base portion transition region is smoothly curved.

14. A dental restoration holding assembly for supporting a dental restoration, comprising:
   a dental restoration holding device for supporting a dental restoration, comprising:
      a base portion with a hollow base shaft defining a base shaft central opening; and a cap portion with a hollow cap shaft defining a cap shaft central opening, wherein the cap portion is integrally formed with the base portion, and wherein the hollow base shaft of the base portion extends from the cap portion, and wherein a maximum inner diameter of the cap portion is greater than minimum outer diameter of the base portion; wherein the base portion comprises a base flange that extends radially outward from the hollow base shaft, opposite the cap portion, and perpendicular to a base shaft central axis that is defined by the base shaft, and wherein the base flange defines a stand portion configured to permit the dental restoration holding device to rest upon a horizontal surface in an upright orientation, wherein the base flange has a flange width and a flange height, wherein the flange width is greater than the flange height, and wherein the hollow base shaft has a shaft height that is greater than the flange height; and a suction tip positioned within the hollow base shaft;

a flexible support sheet positioned between the suction tip and the dental restoration device to define a support surface of the flexible support sheet that spans the base shaft central opening, wherein a portion of the flexible support sheet is positioned between the base shaft and the suction tip;

wherein the base shaft includes an inner shaft catch extending into the base shaft central opening and configured to restrict a suction tip from extending fully through the base shaft central opening and into the cap shaft central opening; and wherein an upper portion of the cap shaft tapers inwardly toward a cap shaft central axis that is defined by the cap shaft to form a splash guard.

* * * * *

UNITED STATES PATENT AND TRADEMARK OFFICE
CERTIFICATE OF CORRECTION

| | | |
|---|---|---|
| PATENT NO. | : 11,883,250 B2 | Page 1 of 1 |
| APPLICATION NO. | : 16/878418 | |
| DATED | : January 30, 2024 | |
| INVENTOR(S) | : Kevin R. Morich | |

It is certified that error appears in the above-identified patent and that said Letters Patent is hereby corrected as shown below:

In the Claims

Claim 14, Column 25, Line 6, after "diameter of the cap portion is greater than" please insert --a--.

Signed and Sealed this
Fifth Day of March, 2024

Katherine Kelly Vidal
*Director of the United States Patent and Trademark Office*